March 26, 1929.      R. H. CHATFIELD      1,707,186
DOUBLE BABY CARRIAGE

Filed May 29, 1928

INVENTOR.
Ruth Hall Chatfield
BY
Zoltan F. Polachek
ATTORNEY

Patented Mar. 26, 1929.

1,707,186

UNITED STATES PATENT OFFICE.

RUTH HALL CHATFIELD, OF FREEPORT, NEW YORK.

DOUBLE BABY CARRIAGE.

Application filed May 29, 1928. Serial No. 281,388.

This invention relates generally to a baby carriage, and has more particular reference to a novel double baby carriage.

The invention has for an object the provision of a device of the class mentioned which is of simple durable construction, desirable and efficient in action, and which can be manufactured and sold at a reasonable cost.

The invention proposes the use of a baby carriage and an attached go-cart at one side thereof, the carriage and go-cart being preferably mounted on four wheels, and provided with a rear handle. The device may be arranged for removal of the go-cart and retraction of the wheels and handle for adaptation with the carriage only.

For further comprehension of the invention, and of the objects and advantages thereof, reference will be had to the following description and accompanying drawings, and to the appended claims in which the various novel features of the invention are more particularly set forth.

In the accompanying drawing, forming a material part of this disclosure:

Figure 1:
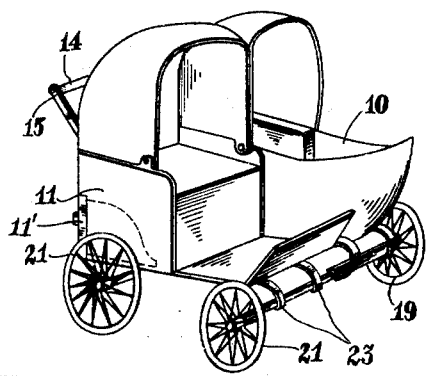
Fig. 1 is a perspective view of a device constructed according to this invention.
Figure 2:
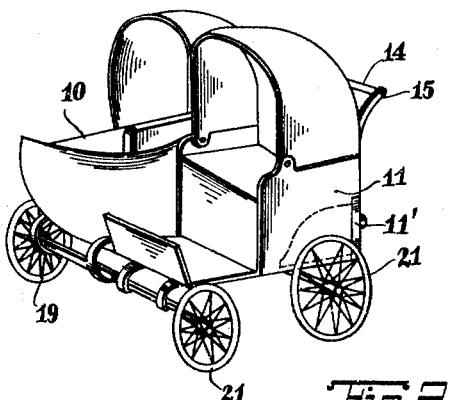
Fig. 2 is a perspective view of the carriage and go-cart differently arranged, but constructed according to the same invention.
Figure 3:
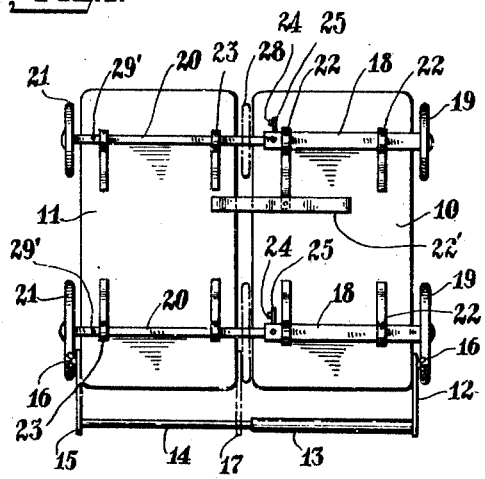
Fig. 3 is a bottom view thereof.
Figure 5:
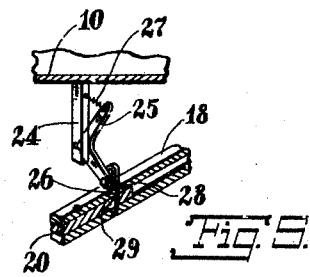
Fig. 5 is a detail perspective view of the locking device engaged in the axle shown in section.
Figure 6:
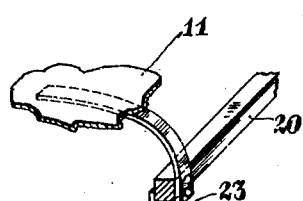
Fig. 6 is a fragmentary detail perspective sectional view of a portion of the axle attached to the bottom of the go-cart.
Figure 4:
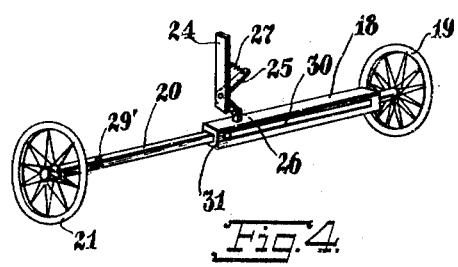
Fig. 4 is a detail perspective view of an axle with wheels, and a locking device as used in the device.

The reference numeral 10 indicates generally the body of a carriage of any design or construction, and numeral 11, the body of a go-cart of any design or construction, and these bodies are positioned side by side as casually seen in Figs. 1 and 2. It is pointed out that in Fig. 1 the go-cart is on the right hand side of the carriage, while in Fig. 2 it is on the left-hand side.

A handle support 12 is secured to the outer side of the carriage, reference being had to the carriage and go-cart, and projects to the rear thereof. A tubular handle member 13 is fixedly attached to the support 12, and an extensible handle 14 is slidably mounted within the tubular handle member 13. A handle support 15 is fixedly connected on the free end of the member 14, and removably connected on the outer side of the go-cart, by a screw 16. Upon removal of the go-cart, handle portion 14 may be retracted and support 15 secured to the free side of the carriage as indicated by the dot dash lines 17.

Hollow shafts 18 are secured transversely across the bottom of the carriage 10 and wheels 19 are rotatively mounted on one of the ends thereof. Shafts 20 are slidably mounted in the shafts 18 and wheels 21 are rotatively mounted on the free ends of the shafts 20. The shafts 18 are secured to the bottom of the carriage 10 by spring braces 22 and shafts 20 are normally secured to the bottom of the go-cart 11 by spring braces 23.

A bar 22' pivoted at its center on the bottom of the carriage 10 and on the free end of one of the spring braces 22, may be turned crosswise for supporting the go-cart 11 when in joined positions. In the single position of the carriage 10 this bar may be turned longitudinally for being disposed beneath the carriage.

A luggage carrier 11' is provided under the seat of carriage 11.

Posts 24 depending from the carriage 10 pivotally support at their lower ends bell cranks 25 having pegs 26 pivotally mounted on their lower ends. Springs 27 act between the posts and the bell cranks for moving the bell cranks so that the pegs normally engage in apertures 28 and 29 formed in the shafts 18 and 20, respectively. The arrangement is such that the shafts 20 are normally held in extended positions, so that wheels 21 are disposed on the outer side of the go-cart 11. The braces 23 may be temporarily removed for disconnecting the go-cart from the shafts 20, and then the bell cranks 25 may be manually moved to free the shafts 20 which may then be retracted within the shafts 18 for positioning the wheels 21 as indicated by the dot dash lines 28. Shafts 20 are formed with apertures 29' for engagement by the pegs 26 for locking the shafts 20 in retracted positions.

This arrangement permits the carriage 10 to be used alone, or the go-cart and carriage to be used together. The shafts 18 are formed with elongated slots 30 engaged by projections 31 from the shafts 20 for limiting the relative motions of the shafts.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention what I claim as new and desire to secure by United States Letters Patent is:

1. In a device of the class described, a carriage having extendible axles for also supporting a go-cart when in extended positions, and an extendible handle for connection with the go-cart when in extended position.

2. In a device of the class described, a carriage having extendible axles for also supporting a go-cart when in extended positions, an extendible handle for connection with the go-cart when in extended position, and a bar pivoted at its center to the bottom of the carriage and arranged for turning to a transverse position for supporting the co-joined go-cart.

3. In a device of the class described, a carriage including a body and hollow axles for supporting wheels at one of their ends, solid axles slidably mounted within the said axles and extending therefrom for supporting wheels on their extended ends, in extended conditions the axles being capable of supporting a co-joined go-cart, said carriage being provided with a tubular handle, and an extensible handle slidably mounted therein and extending therefrom for connection with the co-joined go-cart when in extended position.

4. In a device of the class described, a carriage including a body and hollow axles for supporting wheels at one of their ends, solid axles slidably mounted within the said axles and extending therefrom for supporting wheels on their extended ends, in extended conditions the axles being capable of supporting a co-joined go-cart, said carriage being provided with a tubular handle, and an extensible handle slidably mounted therein and extending therefrom for connection with the co-joined go-cart when in extended position, the hollow axles being formed with elongated slots, and projections from the solid axles to engage in these slots for limiting the relative motions of the axles.

In testimony whereof I have affixed my signature.

RUTH HALL CHATFIELD.